United States Patent
Ward et al.

(10) Patent No.: US 7,548,562 B2
(45) Date of Patent: Jun. 16, 2009

(54) HIGH SPEED ACQUISITION SYSTEM THAT ALLOWS CAPTURE FROM A PACKET NETWORK AND STREAMS THE DATA TO A STORAGE MEDIUM

(75) Inventors: Robert Geoffrey Ward, Colorado Springs, CO (US); Scott Alan Blomquist, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 959 days.

(21) Appl. No.: 11/010,263

(22) Filed: Dec. 14, 2004

(65) Prior Publication Data

US 2006/0126665 A1   Jun. 15, 2006

(51) Int. Cl.
*H04J 3/24* (2006.01)
*G06F 11/00* (2006.01)
*H04L 12/26* (2006.01)

(52) U.S. Cl. .................... 370/474; 370/230.1; 370/338; 370/395.6

(58) Field of Classification Search ......... 370/230–240, 370/389, 395.6, 394, 399, 411, 415, 466, 370/474, 475, 535, 338
See application file for complete search history.

(56) References Cited

U.S. PATENT DOCUMENTS

| | | | |
|---|---|---|---|
| 2003/0026251 A1* | 2/2003 | Morris et al. | 370/389 |
| 2004/0100992 A1* | 5/2004 | Erlenborn et al. | 370/474 |
| 2004/0170152 A1* | 9/2004 | Nagao et al. | 370/338 |

FOREIGN PATENT DOCUMENTS

| | | | |
|---|---|---|---|
| EP | 1274204 | | 3/2004 |
| KR | EP 1274204 | * | 3/2004 |

* cited by examiner

*Primary Examiner*—Afsar M. Qureshi

(57) ABSTRACT

A packet data capture apparatus, method and a computer readable medium having instructions recorded thereon, stream data packets in real time. The apparatus includes: a buffer, to store a plurality of data packets until transmission; a macro-packet transmitter, to prepare macro-packets from the stored plurality of packets and operate in a UDP mode that includes a predetermined re-transmit and flow control protocol; and a processor, to stream the macro-packets to a computer/server or storage device in real time and to retransmit respective macro-packets of the stream of macro-packets via the re-transmit and flow control protocol in accordance with a request from the computer/server.

12 Claims, 3 Drawing Sheets

FIG. 2    200

HIGH SPEED ACQUISITION SYSTEM THAT ALLOWS CAPTURE FROM A PACKET NETWORK AND STREAMS THE DATA TO A STORAGE MEDIUM

BACKGROUND OF THE INVENTION

1. Field of the Invention

The present invention relates generally to capturing data packets from a packet network, processing the data packets, and streaming the processed data packets to a computer or storage device in real time.

2. Description of the Related Art

Early in the evolution of the World Wide Web, database-driven sites consisting of dynamically generated Web pages began replacing Web sites made up of static pages. Thus, static Web sites gave way to the richness and interactivity of Web applications. Serving pages on the fly from a database allowed whole new ways of delivering information customized for the user. A similar revolution in delivering streaming media is underway.

Currently, an Intel xScale processor is utilized with a capture buffer and running a TCP/IP stack that limits streaming or run time store to media (RTSM) to 20 megabits/sec.

In linear and ring Synchronous Digital Hierarchy (SDH) networks or Synchronous Optical Networks (SONET networks), certain requirements for packet data transmission are generally specified to be within predetermined time limits recommended by the standards ITU-T Recommendations. For example, the nominal data rate is 9.95328 Gb/s as defined by the SONET standard rate optical carrier (OC)-192. Problems arise when a packet fails to be received or retransmission of all packets in a sequence is needed.

Multi-protocol over ATM (MPOA) and PPP-over-SONET (POS) are two well known protocols for packet packaging and transport over SONET. One disadvantage of MPOA is its requirement that packetized information be segmented and reassembled to perform Layer 3 IP routing at each intermediate node. This requirement potentially slows the delivery of MPOA packetized information, leading thus to unsatisfactory delivery of video or other time critical information. One disadvantage of POS is that bit errors that cause loss of synchronization increase with average packet size. As multimedia applications tend to have ever larger packet sizes, the reliability of POS potentially decreases for multimedia applications such as streaming video.

SUMMARY OF THE INVENTION

According to an aspect of the present invention, a packet data capture apparatus streams data packets in real time. The apparatus includes: a buffer, to store a plurality of data packets until transmission; a macro-packet transmitter, to prepare macro-packets from the stored plurality of data packets and operate in a UDP (User Datagram Protocol) mode that includes a predetermined re-transmit and flow control protocol; and a processor, to stream the macro-packets to a computer/server or storage device in real time and to retransmit respective macro-packets of the stream of macro-packets via the re-transmit protocol in accordance with a request from the computer/server. The UDP transmission may also use a windowing scheme allow flow control at the receiver. As an example, the receiver may advertise that the sender may send x bytes of data. The sender will then stop sending data after x bytes have been received unless it receives another window update.

According to another aspect of the present invention, the buffer is a circular buffer and includes a write pointer to indicate a write position of the circular buffer and a read pointer to indicate a read position of the circular buffer.

In another aspect of the present invention, the apparatus further comprises a filter to perform pattern matching and filtering of the data packets before the plurality of data packets are stored in the buffer.

In accordance with another aspect of the present invention, the apparatus further comprises a line interface to extract data packets before filtering.

According to another aspect of the present invention, the line interface extracts the data packets directly, or extracts the data packets via Asynchronous Transfer Mode (ATM) reassembly.

According to another aspect of the present invention, the line interface adds a length indicator to each data packet, classifies the data packet, and adds a timestamp to the data packet.

According to another aspect of the present invention, the apparatus streams the macro-packets to the computer/server and the storage device utilizing a circular buffer.

According to another aspect of the present invention, the predetermined re-transmit protocol includes re-transmitting macro-packets that are missing or have an error.

According to another aspect of the present invention, a method streams data packets in real time. The method includes the operations of: using a buffer to store a plurality of data packets until transmission; using a macro-packet transmitter to generate macro-packets from the stored plurality of data packets and transmit the macro-packets using a UDP mode that includes a predetermined re-transmit and flow control protocol; and streaming the macro-packets to a computer/server or a storage device in real time and retransmitting respective macro-packets of the stream of macro-packets via the re-transmit protocol in accordance with a request from the computer/server.

In accordance with an aspect of the present invention, the buffer is a circular buffer and using the buffer includes: indicating a write position of the circular buffer using a write pointer; and indicating a read position of the circular buffer using a read pointer.

According to another aspect of the present invention, the operations further comprise, before using the buffer, using a filter to perform pattern matching and filtering.

According to another aspect of the present invention, the operations further comprise, before using the filter to perform pattern matching and filtering, using a line interface to extract data packets.

In accordance with another aspect of the present invention, the operation of using the line interface to extract data packets includes extracting the data packets directly or extracting the data packets via Asynchronous Transfer Mode (ATM) Adaptation Layer (AAL) reassembly.

According to another aspect of the present invention, the operation of using the line interface to extract data packets includes adding a length indicator to each data packet, classifying the data packet, and adding a timestamp to the data packet.

In accordance with another aspect of the present invention, the predetermined re-transmit and flow control protocol includes re-transmitting macro-packets that are missing or have an error and controlling the transmission rate of the macro-packet transmitter.

According to another aspect of the present invention, a computer readable medium has recorded thereon computer readable instructions to stream data packets in real time. The instructions include: storing a plurality of data packets in a buffer until transmission; forming macro-packets from the plurality of data packets and transmitting the macro-packets in a UDP mode that utilizes a predetermined re-transmit and flow control protocol, and has stored UDP headers of the macro-packets; and streaming macro-packets to a computer/server and a storage device in real time and retransmitting respective macro-packets of the stream of macro-packets via the re-transmit protocol in accordance with a request from the computer/server.

In accordance with another aspect of the present invention, the instructions further comprise, before storing the plurality of data packets in the buffer, filtering to perform pattern matching and filtering.

According to another aspect of the present invention, the instructions further comprise, before filtering to perform pattern matching and filtering, using a line interface to extract data packets by extracting the data packets directly or extracting the data packets via AAL reassembly.

According to another aspect of the present invention, the instructions using the line interface to extract data packets include adding a length indicator to each data packet, classifying the data packet, and adding a timestamp to the data packet.

In accordance with another aspect of the present invention, the predetermined re-transmit protocol includes re-transmitting macro-packets that are missing or have an error.

In accordance with another aspect of the present invention, the predetermined flow control protocol includes the capability to stop the macro-packet transmitter to avoid overflowing the receive buffer on the receiving computer/server.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
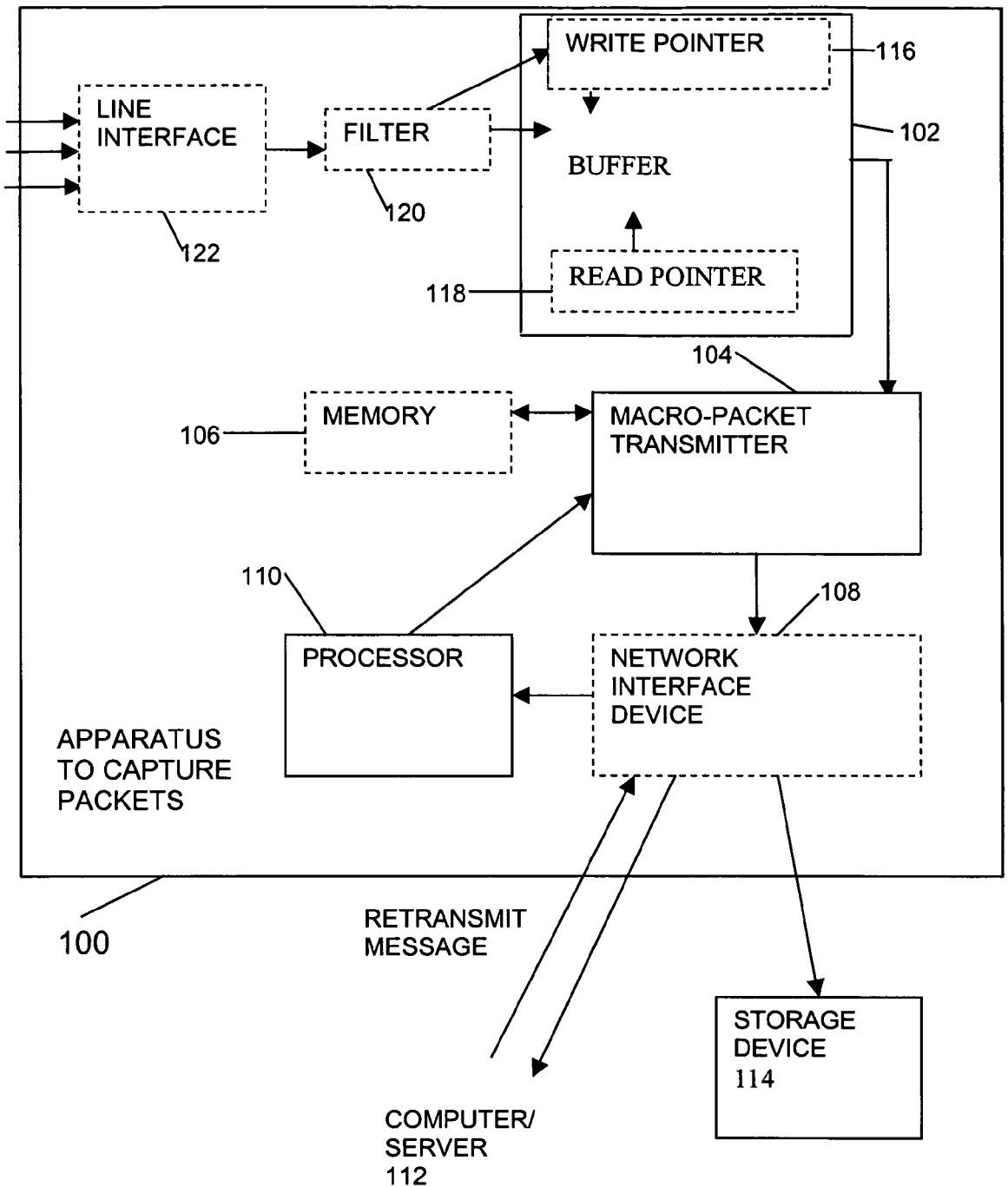
FIG. 1 is a block diagram that depicts, in accordance with an embodiment of the present invention, an apparatus that captures data packets from a packet network and streams the data packets in a form of macro-packets to a computer/server or hard drive in real time.

In the field of communications, it is critical to provide a high bandwidth and reliable, low latency delivery of information such as video, data, and voice. Synchronous Optical Network (SONET) is a well-known standard for high bandwidth transmission that uses optical carriers. SONET is defined in ANSI T1.105, ANSI T1.106, and ANSI T1.117, which are herein incorporated by reference. In Europe, a standard similar to SONET, called Synchronous Digital Hierarchy (SDH) is used.

SONET defines a transmitted unit called "synchronous payload envelope". For Synchronous Transport Signal Level 1 (STS-1), a synchronous payload envelope may be expressed as a 9 row by 90 column structure with 810 bytes total. Columns 1 to 3 correspond to a transport overhead, column 4 corresponds to a path overhead, and columns 4 to 90 correspond to an associated payload. The transport overhead and path overhead together provide operations, maintenance, provisioning, and administration information data channels within the SONET system. The payload stores information such as video, data, or voice, each potentially packaged in various formats.

The format bytes in the section, line, and path overheads are well known in the field of SONET. SONET requires synchronization at three levels: bit, time slot, and frame. Bit synchronization refers to the transmission and receipt of bits with respect to a master clock frequency. Time slot synchronization refers to the alignment of transmitter and receiver so that time slots may be identified for retrieval of data. Time slot synchronization is accomplished by using a fixed frame format that separates overhead and payloads. Frame synchronization is the requirement that the beginning of each payload may be identified according to the master clock frequency. Frame synchronization further includes identifying the beginning of each frame/packet payload within the SONET payload according to the master clock frequency.

Bit errors in transmitted packets or frames may lead to loss of synchronization, which can result in the discarding of packets or frames. One source of bit errors is improper frame/packet delineation, i.e., improper determination of a frame or packet boundary. Another source of bit errors is a noisy communications link.

It is known that SONET may be used as a transport mechanism at the transport-layer for both Asynchronous Transfer Mode (ATM) and packet data. As the term is employed herein, data includes any type of information that may be represented digitally, and includes such time-sensitive data such as streaming video or voice, and/or non time-sensitive data such as computer files. Packet technology includes TCP/IP (Transmission Control Protocol over Internet Protocol), token ring, and the like. One example of packet technology is IP (Internet Protocol) packets transmitted over OSI layer 2. Another example of packet technology is Ethernet. ATM and SONET technologies are well known and well defined and will not be elaborated further here. Similarly, the various layers of the OSI 7-layer model are also well known and well defined and are not described herein.

SONET includes a set of signal rate multiples for transmitting digital signals on optical fiber. The base rate (OC-1) is 51.84 Mbps. An Optical Carrier Level circuit such as OC3 (Optical Carrier Level 3, fiber optic, 2016 Voice Circuits at 155.520 Mbps) is a high end MultiMeg circuit that may be used, for example, for large sized businesses.

The speed of an OC3 connection is 155 Mbps. This is equivalent to 3 T3 lines or 84 T1 lines.

The format of the ingress frames/packets includes, for example, Frame Relay, TCP/IP, ATM, or Ethernet signals.

FIG. 1 is a block diagram that depicts, in accordance with an embodiment of the present invention, an apparatus 100 that captures data packets from a packet network, processes the data packets, and streams the data packets to a computer, server or hard drive in real time. Referring now to FIG. 1, the apparatus 100 includes a buffer 102, to store a plurality of data packets until transmission; a macro-packet transmitter 104, to prepare macro-packets from the plurality of stored packets and operate in a UDP mode that includes a predetermined re-transmit protocol; and a processor 110, to stream the macro-packets to a computer/server 112 or storage device 114 in real time, communicate with the computer/server 112, and to retransmit respective macro-packets of the stream of macro-packets in accordance with a request from the computer/server 112. The buffer 102, for example, may be a circular buffer.

Other implementations are possible. The apparatus 100 may be selected to operate in a TCP/IP mode or a UDP mode. A memory 106 external to the macro-packet transmitter 104 may also be utilized. A network interface device 108 to provide an interface between the processor 110, the macro-packet transmitter 104, the computer/server 112 and the storage device 114 may provide registers and memory space for temporarily storing information and may be implemented in a position that is external to the processor 110.

The buffer 102 may be a circular buffer and may have a write pointer 116 to indicate a write position and a read pointer 118 to indicate a read position. Data packets are written into the circular buffer, and the write buffer is increased by the size of the data packet plus its overhead, such as length, timestamp and packet classification flags. Multiple buffers or a single interleaved buffer may be used to store data from a full duplex communications link, or from multiple full duplex communication links.

The macro-packet transmitter 104 generally may operate in one of three modes that are selectable by a user: the TCP/IP mode, the UDP mode, and the UDP mode plus a predetermined re-transmit and flow control protocol. The TCP/IP mode is used, for example, when the Ethernet links to and from a computer or a disk are not a directly wired (fiber) link, i.e., are passed through an intermediate switch that causes packet loss and a non-guaranteed data rate. The TCP/IP mode reads a local memory and places a checksum on the packet before sending the packet to the network interface device 108. Thus, although retransmission and rate control are provided using the TCP/IP protocol, the speed of transmission of the data packets in the TCP/IP mode is decreased, and the system may become overloaded. The UDP mode is a User Datagram Protocol that simply broadcasts, multicasts, or unicasts packets and is used when writing data to a disk via a dedicated Ethernet link. That is, in the UDP mode, there is no flow control or retransmission capability. Hence, in the UDP mode, video internet transmission may be impaired. However, in the UDP mode, even though there may be no computation of CRCs, and packets may be lost, audio transmission is generally acceptable. The UDP mode that implements the predetermined re-transmit and flow control protocol is used when passing data to a computer at a high rate, and the computer has software that implements the predetermined re-transmit and flow control protocol. Hence, in the UDP mode plus the predetermined re-transmit and flow control protocol, data packets are transmitted efficiently, and data packets that are missing or have an error are re-transmitted, yielding an efficient operation.

When the data in the buffer reaches a predetermined amount, for example, when the untransmitted data packets have a combined length that is greater than 64 K Bytes, the macro-packet transmitter 104 outputs to the network interface device 108, a UDP header followed by a predetermined header, up to 64 kBytes of data, and a checksum of the entire datagram. For example, the checksum may be a CRC-32.

The predetermined header may include a sequence number, a flag that indicates that the present macro-packet is the result of a re-transmission request, a length of the amount of data that is in this macro-packet, and an indicator of the type of macro-packet. The macro-packet transmitter 104 may also implement a time-out mechanism such that, if the data accumulated in the buffer doesn't reach 64 kBytes in a predetermined time, then the data in the buffer at the end of the predetermined time is output as a macro-packet.

In addition, the macro-packet transmitter 104 may respond to requests from the processor 110 to retransmit a particular macro-packet, given the sequence number of the macro-packet. The macro-packet transmitter 104 typically has a memory 106, so that a sequence number of a macro-packet may be looked up to determine the macro-packet's length and the read pointer at the start of the macro-packet.

Also, the macro-packet transmitter 104 may respond to requests from a processor to re-transmit all macro-packets starting from a selected sequence number. Where desired, the macro-packet transmitter 104 may respond to requests from a processor to re-transmit all macro-packets from a selected sequence number onwards, but mark the macro-packet to indicate that the requested macro-packets are no longer available, and retransmission is starting from the next available macro-packet. The macro-packet transmitter may also be paused by a flow control mechanism tracked by either the processor 110 or the macro-packet transmitter 104.

The processor 110 is used for general control of an entire packet network streaming system. The processor 110 typically communicates with a controlling computer/server 112. In one embodiment the processor may communicate using a TCP/IP stack via the network interface device 108. Thus, the processor 110 may receive messages that are specially marked requesting the re-transmission of all packets starting at a selected sequence number. An example of a suitable processor is a xScale SA-1110, which is available from INTEL®. Where a network interface device 108 is utilized, the network interface 108 may, for example, be a network interface chip, which streams macro-packets to a computer.

A computer/server 112 operates the receiving end of the predetermined re-transmit and flow control protocol. The predetermined re-transmit protocol receives macro-packets and examines the CRC and the sequence number. Under optimal conditions, the received macro-packets are in order and are error-free. If a macro-packet is missing or includes an error, then the computer/server 112 may request re-transmission of the macro-packet in accordance with the corresponding sequence number. If the computer/server 112 is significantly out of step with the transmission, the computer/server 112 may request that all macro-packets are to be re-transmitted from a selected sequence number.

Flow control may be utilized to avoid cases where the macro-packet transmitter may send data too fast for the computer/server to receive. The computer/server 112 will send periodic window size updates (along with the sequence number) to the network interface device 108, which are in turn routed to the processor 110, which in turn are sent to the macro-packet transmitter 104. The macro packet transmitter 104 will stop transmitting when it reaches the byte position in the buffer that corresponds to the sequence number plus the window size so that the computer/server 112 will not overflow its receive buffer.

The apparatus 100 may further include a filter 120, coupled to the buffer 102, to perform pattern matching and filtering before placing the data packets in the buffer. In addition, where desired, the apparatus 100 may include a line interface 122, coupled to the filter 120, to extract data packets before filtering. The line interface 122 may extract the data packets directly or extract the data packets via AAL reassembly. The line interface 122 may also add a length indicator to each data packet, classify the data packet, and add a timestamp to the data packet. The line interface 122 has receivers for one or more ports of various line interface standards, e.g., T1, E1, OC3, 100baseT, 1000baseTx, and the like.

The apparatus 100 is generally arranged to stream the macro-packets to at least one of: the computer/server 112, or the storage device 114.

As is clear to those skilled in the art, the present invention is not limited to the specific configurations shown in FIG. 1. For example, a specialized buffer may be implemented in place of the buffer 102. A network interface chip may be used for the network interface device 108, or, alternatively, the processor 110 may implement the functions of the network interface device 108, avoiding the need for a separate network interface device 108 component. Alternatively a network processor may be used in place of both the macro-packet transmitter 104 and the processor 110.

Figure 2:
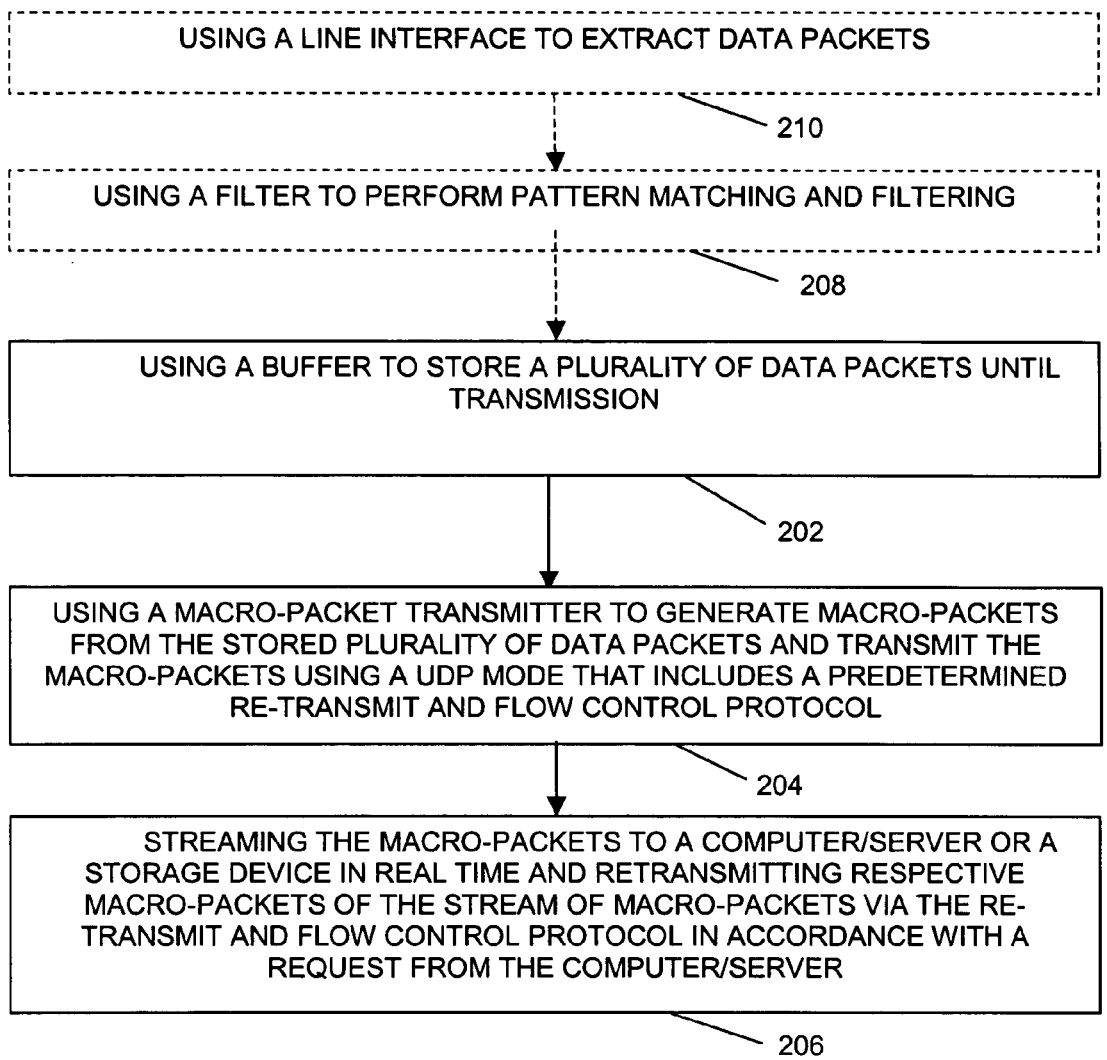
FIG. 2 is a flow chart illustrating a process 200 that streams data packets in the form of macro-packets in real time in accordance with an embodiment of the present invention.

FIG. 2 is a flow chart illustrating a process 200 that streams data packets in real time in accordance with an embodiment of the present invention. Referring now to FIG. 2, in operation 202, a buffer is used to store a plurality of data packets until transmission. The data packets may be accumulated until a predetermined amount of data is received, and/or a timer may be preset to determine when the accumulated data packets may be transmitted.

From operation 202, the process moves to operation 204, in which a macro-packet transmitter generates macro-packets from the plurality of packets and transmits the macro-packets using a UDP mode that includes a predetermined re-transmit and flow control protocol. The predetermined re-transmit protocol generally includes re-transmitting macro-packets that are missing or have an error. The macro-packets have stored UDP headers which enable the selection of the desired macro-packets to be resent when a computer/server requests retransmission of selected macro-packets. Alternatively, the macro-packet headers may be prepended or appended onto data as it is written into the buffer, or the macro-packet headers may be written into a separate buffer. This simplifies the re-transmission scheme.

From operation 204, the process moves to operation 206, in which the macro-packets are streamed to a computer/server or a storage device in real time, and the computer/server checks to determine whether macro-packets are missing or have errors, and if so, requests retransmission of the desired macro-packets, which are then retransmitted by the macro-packet transmitter.

In operation 206, the streaming of frames to the computer/server may be paused using a predetermined flow control protocol. The flow control protocol pauses the transmitter when it has transmitted enough data to fill up the receive buffers on the computer/server.

Operation 202 of using the buffer may include indicating a write position using a write pointer and indicating a read position using a read pointer.

Where desired, before operation 202 using the buffer, operation 208 may be implemented to use a filter to perform pattern matching and filtering. In addition, before implementing operation 208, operation 210 may be implemented to use a line interface to extract data packets. The operation 210 of using the line interface to extract data packets may include one of: extracting the data packets directly, or extracting the data packets via AAL reassembly. In addition, operation 210 of using the line interface to extract data packets may include adding a length indicator to each data packet, classifying the data packet, and adding a timestamp to the data packet.

Variations may be made to the operations of the above-described process 200 of an embodiment of the present invention without changing the functionality of the present invention.

Figure 3:
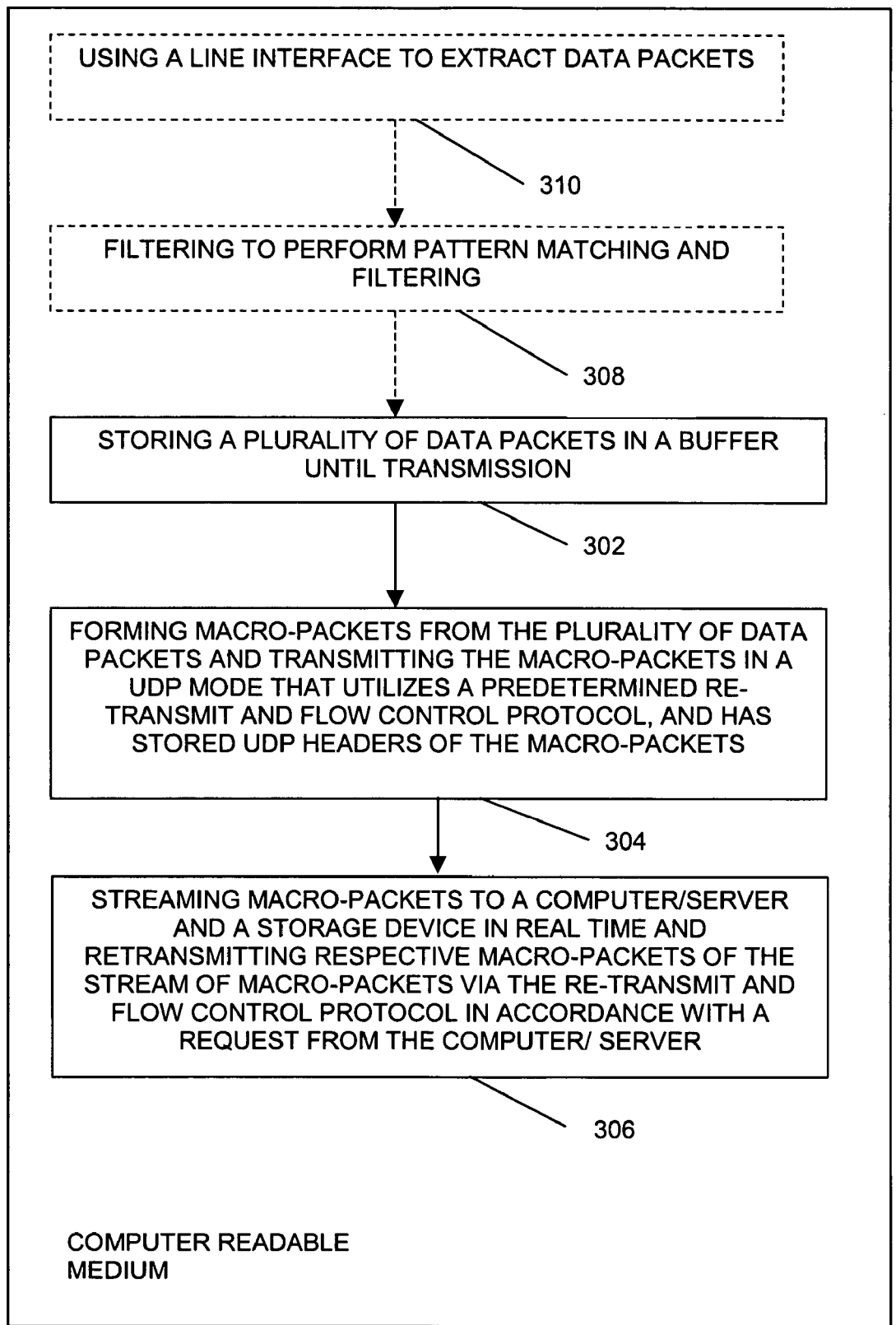
FIG. 3 is a block diagram of a computer readable medium having recorded thereon computer readable instructions to stream data packets in the form of macro-packets in real time in accordance with an embodiment of the present invention.

FIG. 3 is a block diagram of a computer readable medium 300 having recorded thereon computer readable instructions to stream data packets in real time in accordance with an embodiment of the present invention. Referring now to FIG. 3, in operation 302, the instructions store a plurality of data packets in a buffer until transmission. A predetermined amount of data may be preset for the buffer, and/or a time limit may be preset to determine when a macro-packet is to be sent, regardless of whether the predetermined amount of data has been received.

From operation 302, the instructions move to operation 304, in which macro-packets are formed from the plurality of data packets and the macro-packets are transmitted in a UDP mode that utilizes a predetermined re-transmit and flow control protocol, and has stored UDP headers of the macro-packets. The predetermined re-transmit and flow control protocol generally includes re-transmitting macro-packets that are missing or have an error and pausing transmission when enough data has been sent to fill up the receiver's receive buffer.

From operation 304, the instructions move to operation 306, in which the macro-packets are streamed to at least one of: a computer/server or a storage device, streaming macro-packets to at least one of: a computer/server or a storage device in real time, communicating with the computer/server, and retransmitting respective macro-packets of the stream of macro-packets in accordance with a request from the computer/server.

In accordance with the implementation above, instructions may include, prior to the operation 302 of storing a plurality of data packets in a buffer until transmission, operation 308 to implement a filter to perform pattern matching and filtering of the plurality of data packets. Also, where desired, instructions may include, before the operation 308 of implementing a filter to perform pattern matching and filtering 308, operation 310 of using a line interface to extract data packets by one of: extracting the data packets directly, or extracting the data packets via ML reassembly. The instructions for operation 310 of using a line interface to extract data packets may also include instructions to add a length indicator to each data packet, classify the data packet, and add a timestamp to the data packet. That is, generally, the operations of the process 200 may be incorporated into the computer readable instructions of the computer readable medium 300.

Although an example of an embodiment of computer readable instructions of the computer readable medium is provided above, it is noted that variations of the instructions may be implemented without departing from the functionality of the present invention.

Various protocols and standards are described herein. However, the present invention is not limited to any particular protocol and/or standard.

The present invention may be embodied as computer readable codes on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). In addition, the computer readable recording medium may be distributed over network coupled computer systems so that the computer readable code is stored and executed in a distributed fashion.

Although a few embodiments of the present invention have been shown and described, it would be appreciated by those skilled in the art that changes may be made in these embodi-

The invention claimed is:

1. An apparatus, comprising:
   a buffer, to store a plurality of data packets until transmission;
   a filter to perform pattern matching and filtering of the plurality of data packets before the plurality of data packets are stored in the buffer;
   a line interface to extract data packets before filtering, wherein at least one of:
      the line interface extracts the data packets directly,
      the line interface extracts the data packets via AAL reassembly, or
      the line interface adds a length indicator to each data packet, classifies the data packet, and adds a timestamp to the data packet;
   a macro-packet transmitter, to prepare macro-packets from the stored plurality of data packets and operate in a UDP mode that includes a predetermined re-transmit protocol; and
   a processor, to stream the macro-packets to a computer/server or storage device in real time and to retransmit respective macro-packets of the stream of macro-packets via the re-transmit protocol in accordance with a request from the computer/server.

2. The apparatus of claim 1, wherein the buffer is a circular buffer and further comprises:
   a write pointer to indicate a write position of the circular buffer; and
   a read pointer to indicate a read position of the circular buffer.

3. The apparatus of claim 1, wherein the apparatus streams the macro-packet to the computer/server and the storage device utilizing a circular buffer.

4. The apparatus of claim 1, wherein the predetermined re-transmit protocol includes re-transmitting macro-packets that are missing or have an error.

5. The apparatus of claim 1, further comprising a predetermined flow control protocol including a mechanism for flow control whereby a windowing scheme is used to ensure the transmitter does not overwhelm a receiver.

6. A method to stream data packets, the method comprising:
   using a buffer to store a plurality of data packets until transmission;
   before using the buffer, using a filter to perform pattern matching and filtering;
   before using the filter to perform pattern matching and filtering, using a line interface to extract the data Dackets. wherein usinci the line interface to extract data packets includes adding a length indicator to each packet, classifying the data packet, and adding a timestamp to the data packet;
   using a macro-packet transmitter to generate macro-packets from the stored plurality of data packets and transmit the macro-packets using a UDP mode that includes a predetermined re-transmit and flow control protocol; and
   streaming the macro-packets to a computer/server and a storage device in real time and retransmitting respective macro-packets of the stream of macro-packets via the re-transmit and flow control protocol in accordance with a request from the computer/server.

7. The method of claim 6, wherein the buffer is a circular buffer and using the buffer includes:
   indicating a write position of the circular buffer using a write pointer; and indicating a read position of the circular buffer using a read pointer.

8. The method of claim 6, wherein using the line interface to extract data packets includes extracting the packets directly or extracting the packets via Asynchronous Transfer Mode (ATM) reassembly.

9. The method of claim 6, wherein the predetermined re-transmit protocol includes re-transmitting macro-packets that are missing or have an error.

10. The method of claim 6, wherein the predetermined flow control protocol includes pausing the macro-packet transmitter to avoid overflowing a receiver of the data.

11. A computer readable medium, excluding carrier waves, having recorded thereon computer readable instructions to stream data packets, the instructions comprising: instructions to cause a computer system to store a plurality of data packets in a buffer until transmission;
   instructions to cause the computer system to, before storing the plurality of data packets in the buffer, filter the plurality of data packets to perform pattern matching and filtering:
   instructions to cause the computer system to, before filtering to perform pattern matching and filtering, use a line interface to extract data packets, wherein extracting the data packets includes at least one of:
      extracting the packets directly;
      extracting the packets via ML reassembly; or
      adding a length indicator to each packet, classifying the data packet, and adding a timestamp to the data packet;
   instructions to cause the computer system to form macro-packets from the plurality of data packets and transmitting the macro-packets in a UDP mode that utilizes a predetermined re-transmit and flow control protocol, and has stored UDP headers of the macro-packets; and
   instructions to cause the computer system to stream macro-packets to a computer/server and a storage device in real time, and retransmitting respective macro-packets of the stream of macro-packets via the re-transmit and flow control protocol in accordance with a request from the computer/server.

12. The computer readable medium of claim 11, wherein the predetermined re-transmit protocol includes re-transmitting macro-packets that are missing or have an error.

* * * * *